(12) United States Patent
Aikens (10) Patent No.: US 11,069,925 B2
(45) Date of Patent: Jul. 20, 2021

(54) HETEROGENEOUS BATTERY SYSTEM AND METHOD

(71) Applicant: THE BOEING COMPANY, Chicago, IL (US)

(72) Inventor: Sheverria Aikens, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 274 days.

(21) Appl. No.: 16/058,254

(22) Filed: Aug. 8, 2018

(65) Prior Publication Data
US 2020/0052349 A1    Feb. 13, 2020

(51) Int. Cl.
| B60R 16/03 | (2006.01) |
| B60R 16/04 | (2006.01) |
| H01M 10/42 | (2006.01) |
| B60R 16/033 | (2006.01) |
| H02J 7/00 | (2006.01) |
| H01M 10/0525 | (2010.01) |
| H01M 10/44 | (2006.01) |
| H01M 50/502 | (2021.01) |

(52) U.S. Cl.
CPC ....... *H01M 10/4257* (2013.01); *B60R 16/033* (2013.01); *H01M 10/0525* (2013.01); *H01M 10/441* (2013.01); *H01M 50/502* (2021.01); *H02J 7/0021* (2013.01); *H02J 7/0063* (2013.01); *H01M 2010/4271* (2013.01); *H01M 2220/20* (2013.01); *H02J 2007/0067* (2013.01)

(58) Field of Classification Search
CPC ...... B60L 2200/10; B60L 58/20; B60L 58/13; H01M 10/0525; H01M 10/441; H02J 7/0063; H02J 2007/0067; H02J 1/102
See application file for complete search history.

(56) References Cited

U.S. PATENT DOCUMENTS

| 7,136,701 | B2 | 11/2006 | Greatbatch et al. |
| 9,189,056 | B2 | 11/2015 | Rahal-Arabi et al. |
| 9,472,961 | B2 | 10/2016 | De Cock |
| 9,787,092 | B2 * | 10/2017 | Scheffler .................. H02J 4/00 |
| 2009/0085400 | A1 * | 4/2009 | Baumann .................. B60L 1/00 307/9.1 |
| 2016/0118830 | A1 * | 4/2016 | Jeon ...................... H02J 7/0025 320/127 |
| 2017/0101029 | A1 * | 4/2017 | Kawano .................... B60L 1/02 |
| 2019/0092257 | A1 * | 3/2019 | Boecker ................ H02J 7/1423 |
| 2019/0226859 | A1 * | 7/2019 | Li ........................... B60L 58/12 |

* cited by examiner

*Primary Examiner* — Jared Fureman
*Assistant Examiner* — Esayas G Yeshaw
(74) *Attorney, Agent, or Firm* — Moore IP Law (57) ABSTRACT

An electrical power management system for a vehicle and method of operation are described. The electrical power management system includes a control circuit configured to monitor and control power to a battery bus of the vehicle. The electrical power management system also includes a first coupler configured to be coupled to a first battery and to the battery bus, the first coupler responsive to the control circuit to selectively couple the first battery to the battery bus, the first battery having a first battery chemistry. The electrical power management system includes a second coupler configured to be coupled to a second battery and to the battery bus, the second coupler responsive to the control circuit to selectively couple the second battery to the battery bus, the second battery having a second battery chemistry distinct from the first battery chemistry.

20 Claims, 5 Drawing Sheets

HETEROGENEOUS BATTERY SYSTEM AND METHOD

FIELD OF THE DISCLOSURE

The present disclosure is generally related to management of a system that includes multiple types of batteries.

BACKGROUND

Advancements of lithium-ion (Li-ion, LION) batteries and other energy storage sources are instrumental in the development of long-range electrically powered vehicles. To illustrate, automobiles, aircraft, and other vehicles can be configured to have a hybrid electric configuration or an all-electric configuration. Lithium-ion battery chemistry can be designed based on a predicted application of the battery, such as for high energy demand applications or for high power demand applications. However, designing batteries for high specific energy applications (energy density) comes at a penalty of reduced specific power (power density), and vice versa. Therefore, battery design for electric vehicles involves determining a balance between various features, such as energy density and power density, to accommodate a range of specific applications that may be encountered.

SUMMARY

In a particular implementation, an electrical power management system for a vehicle includes a control circuit configured to monitor and control power to a battery bus of the vehicle. The electrical power management system also includes a first coupler configured to be coupled to a first battery and to the battery bus. The first coupler is responsive to the control circuit to selectively couple the first battery to the battery bus. The first battery has a first battery chemistry. The electrical power management system includes a second coupler configured to be coupled to a second battery and to the battery bus. The second coupler is responsive to the control circuit to selectively couple the second battery to the battery bus. The second battery has a second battery chemistry distinct from the first battery chemistry.

In another particular implementation, a method of operating an electrical power management system for a vehicle includes receiving data indicating an electrical condition of a battery bus of the vehicle. The battery bus is coupled to a first battery via a first coupler and coupled to a second battery via a second coupler, and the second battery has a second battery chemistry distinct from a first battery chemistry of the first battery. The method also includes sending a first control signal to the first coupler and a second control signal to the second coupler to control power applied to the battery bus from the first battery and from the second battery responsive to the electrical condition.

The features, functions, and advantages described herein can be achieved independently in various implementations or may be combined in yet other implementations, further details of which can be found with reference to the following description and drawings.

DETAILED DESCRIPTION

Embodiments disclosed herein perform power management of heterogeneous battery systems that include batteries having different characteristics, such as a first battery with a higher power density and lower energy density coupled in parallel with a second battery with a lower power density and higher energy density. A control system can adjust amounts of power provided by each of the batteries in a heterogeneous battery system based on a power demand of one or more loads powered by the battery system. For example, when a load that is powered by a heterogeneous battery system presents a high power demand, the control system can increase a proportion of power that is provided by a higher power density (and lower energy density) battery. When the load transitions from high power demand to low power demand, the control system can increase a proportion of power that is provided by a higher energy density (and lower power density) battery. By controlling the proportion of power provided to a load from various batteries having different characteristics based on a power demand of a load, a heterogeneous battery system can provide improved performance, such as more energy and power for longer operating capabilities, over varying load conditions and at a reduced weight and volume as compared to using a system of homogeneous batteries.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, in FIG. 1 a coupler 114 is illustrated and associated with reference numbers 114A in FIG. 2, 114B in FIG. 3, and 114C in FIG. 4. When referring to a particular one of these couplers, such as the coupler 114A, the distinguishing letter "A" is used. However, when referring to any arbitrary one of these couplers or to these couplers as a group, the reference number 114 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Figure 1:
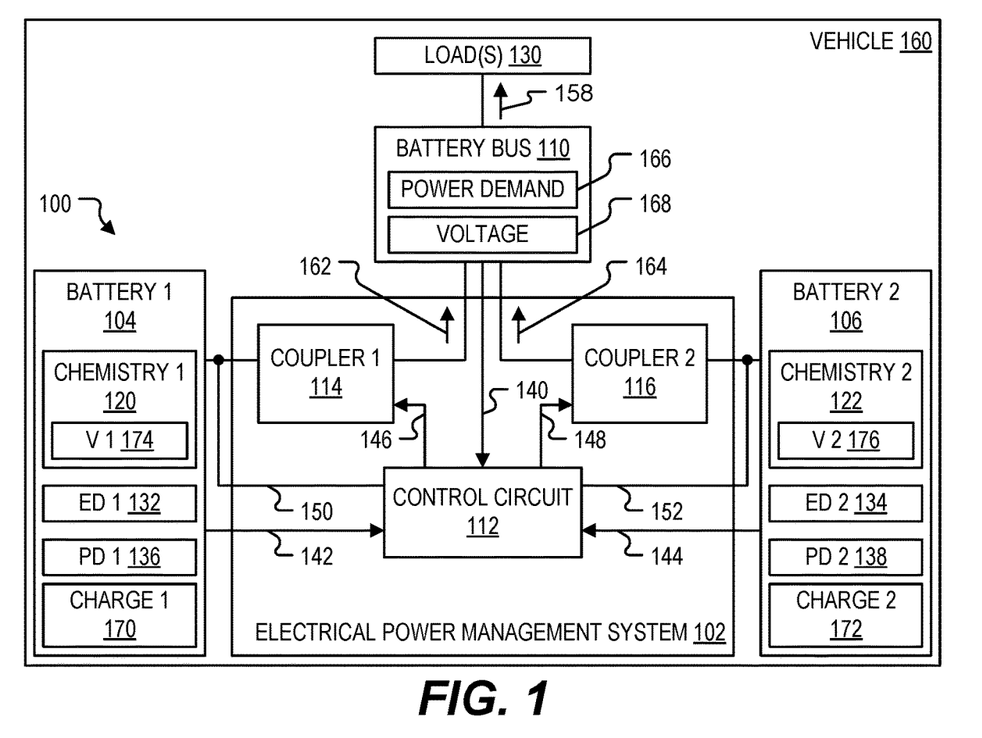
FIG. 1 is a diagram that illustrates a vehicle that includes an electrical power management system configured to manage power from heterogeneous batteries.

Referring to FIG. 1, a system 100 is depicted that includes an electrical power management system 102 for a vehicle 160, such an automobile, watercraft, aircraft, spacecraft, or other type of vehicle. The electrical power management system 102 is configured to control power provided by a first battery 104 and a second battery 106 to one or more loads 130 that are coupled to a battery bus 110. By adjusting power provided by the first battery 104 and power provided by the second battery 106 based on a condition at the battery bus 110, the electrical power management system 102 increases system performance by reducing inefficiencies due to mismatching battery characteristics to load demands, such as an inefficiency resulting from using a high energy density battery to satisfy a high power demand.

The first battery 104 has a first battery chemistry 120, and the second battery 106 has a second battery chemistry 122 that is distinct from the first battery chemistry 120. The first battery 104 and the second battery 106 have different battery characteristics due to the different battery chemistries. In a particular example, the first battery chemistry 120 is optimized or configured to have a first power density (PD 1) 136 and also has a first energy density (ED 1) 132, and the second battery chemistry 122 is optimized or configured to have a second energy density (ED 2) 134 and also has a second power density (PD 2) 138. The first power density 136 is higher than the second power density 138, and the first energy density 132 is lower than the second energy density 134. In some implementation. the first battery chemistry 120 includes a first lithium-ion battery chemistry that is optimized or configured for power capability, and the second battery chemistry 122 includes a second lithium-ion battery chemistry that is optimized or configured to provide energy capability. In other implementations, the first battery chemistry 120 includes a lithium-ion battery chemistry, and the second battery chemistry includes a non-lithium-ion battery chemistry, such as a nickel-cadmium (NiCad)-type chemistry.

The first battery 104 having the first battery chemistry 120 is configured to have a first battery voltage (V 1) 174 (e.g., the first battery chemistry 120 corresponds to the first battery voltage 174) and the second battery 106 having the second battery chemistry 122 is configured to have a second battery voltage (V 2) 176 (e.g., the second battery chemistry 122 corresponds to the second battery voltage 176). In some implementations, the first battery voltage 174 is substantially the same as the second battery voltage 176, such as described with reference to FIG. 2. In other implementations, the first battery voltage 174 is different from the second battery voltage 176, such as described with reference to FIG. 3 and FIG. 4.

The electrical power management system 102 includes a control circuit 112 coupled to a first coupler 114 and to a second coupler 116. The control circuit 112 is configured to be coupled to the battery bus 110 of the vehicle 160 and to monitor and control power to the battery bus 110. In a particular implementation, the control circuit 112 is configured to control the first coupler 114 and the second coupler 116 so that power 158 supplied to a load 130 via the battery bus 110 is predominately provided by the first battery 104 or the second battery 106 in response to at least one of a power demand 166 of the load 130, a type of the load 130, a voltage 168 of the battery bus 110, a first state of charge 170 of the first battery 104, a second state of charge 172 of the second battery 106, or a vehicle data input, as illustrative, non-limiting examples.

The control circuit 112 is configured to detect a power demand 166 of the battery bus 110 indicative of a power demand of the one or more loads 130. For example, the power demand 166 may be indicative of a voltage demand, a current demand, or a combination thereof, resulting from the aggregated demands of load devices that are coupled to the battery bus 110. The load devices, collectively referred to as load 130, may include devices such as processors, controllers, computers, entertainments systems, navigation devices, communication devices, or other electronic devices associated with operation of the vehicle 160. Alternatively, or in addition, the load 130 may include motors, compressors, power electronics, one or more other relatively high power consumption components, or a combination thereof.

The control circuit 112 is configured to receive data 140 indicating an electrical condition of the battery bus 110. In an implementation, a sensor coupled to the battery bus 110 detects the electrical condition, such as the power demand 166, and generates the data 140. In another implementation, at least a portion of the data 140 is generated by one or more load devices coupled to the battery bus 110 and is routed to the control circuit 112, such as via a dedicated signaling line, via signaling on the battery bus, or via one or more other signaling mechanisms.

The first coupler 114 is configured to be coupled to the first battery 104 and to the battery bus 110 and is responsive to the control circuit 112 to selectively couple the first battery 104 to the battery bus 110. To illustrate, the first coupler 114 is configured to receive a first control signal 146 from the control circuit 112. The first coupler 114 is configured to adjust a first power 162 provided by the first battery 104 to the battery bus 110 responsive to a value of the first control signal 146, as described in further detail below.

The second coupler 116 is configured to be coupled to the second battery 106 and to the battery bus 110. The second coupler 116 is responsive to the control circuit 112 to selectively couple the second battery 106 to the battery bus 110. To illustrate, the second coupler 116 is configured to receive a second control signal 148 from the control circuit 112. The second coupler 116 is configured to adjust a second power 164 provided by the second battery 106 to the battery bus 110 responsive to a value of the second control signal 148, as described in further detail below.

The control circuit 112 is configured to control the first coupler 114 and the second coupler 116 so that power 158 supplied to the load 130 via the battery bus 110 is predominately, or entirely, provided by the first battery 104 responsive to a high power demand of the load 130. The control circuit 112 is also configured to control the first coupler 114 and the second coupler 116 so that the power 158 supplied to the load 130 is predominately, or entirely, provided by the second battery 106 responsive to a high energy demand of the load 130. In an example, the control circuit 112 generates the first control signal 146 to instruct the first coupler 114 to adjust a connection between the first battery 104 and the battery bus 110 and generates the second control signal 148 to instruct the second coupler 116 to adjust a connection between the second battery 106 and the battery bus 110. In some implementations, the first control signal 146 and the second control signal 148 are distinct signals separately generated by the control circuit 112. In other implementations, the first control signal 146 and the second control signal 148 are generated by the control circuit as a single signal that is provided to the first coupler 114 and to the second coupler 116.

In some implementations, the control circuit 112 is configured to control the first coupler 114 and the second coupler 116 to smoothly control the power applied to the battery bus 110 from the first battery 104 and from the second battery 106 responsive to the power demand 166 at the battery bus 110. For example, as described in further detail with reference to FIG. 4, the first coupler 114 and the second coupler 116 may include regulators that are controllable to smoothly adjust the first power 162, the second power 164, or both.

In other implementations, the control circuit 112 is configured to adjust the proportion of power applied to the battery bus 110 from the first battery 104 and from the second battery 106 responsive to the power demand 166 via control of one or more switches. For example, as described in further detail with reference to FIG. 3, the first coupler 114 and the second coupler 116 may include switches that are controllable to connect or disconnect the first battery 104 to the battery bus 110, to connect or disconnect the second battery 106 to the battery bus 110, or a combination thereof.

In some implementations, the control circuit 112 is configured to control the first coupler 114 and the second coupler 116 based on a type of the load 130. For example, a motor load running at its idle speed may be powered through the first coupler 114 and when running at high speed or high torque may be powered through the second coupler 116 or through both the first coupler 114 and second coupler 116.

In some implementations, the control circuit 112 is configured to control the first coupler 114 and the second coupler 116 to maintain at least a minimum level of a voltage 168 of the battery bus 110, to maintain the voltage of the first battery 104 and the second battery 106 above a minimum depth of discharge, or a combination thereof. For example, if the voltage 168 is substantially the same as (e.g., does not differ by more than a voltage threshold from) the first battery voltage 174 of the first battery 104 and the first battery voltage 174 is above the minimum depth of discharge and is higher than the second battery voltage 176 by more than the voltage threshold, the control circuit 112 may control the first coupler 114 to couple the first battery 104 to the battery bus 110 and may control the second coupler 116 to decouple the second battery 106 from the battery bus 110. As another example, if the first battery voltage 174 and the second battery voltage 176 are both within the voltage threshold of the voltage 168, the control circuit 112 may select either, or both, of the first battery 104 and the second battery 106 to power the battery bus 110.

In some implementations, the control circuit 112 is configured to control the first coupler 114 and the second coupler 116 based on the first state of charge 170 of the first battery 104, the second state of charge 172 of the second battery 106, or a combination thereof. For example, the control circuit 112 may be configured to prevent use of the first battery 104 when the first state of charge 170 is below a first charge threshold, to prevent use of the second battery 106 when the second state of charge 172 is below a second charge threshold, and to select the battery that has the highest state of charge when both batteries 104, 106 are below the respective charge thresholds.

In some implementations, the control circuit 112 is configured to control the first coupler 114 and the second coupler 116 based on a vehicle data input. For example, the control circuit 112 may receive data indicating one or more scheduled tasks to be performed by devices coupled to the battery bus 110 during operation of the vehicle 160 and may predictively control the first coupler 114 and the second coupler 116 to power the battery bus 110 with the most appropriate battery (or combination of batteries) based on upcoming scheduled tasks. Additional details regarding controlling power to the battery bus 110 based on vehicle data are provided with reference to the implementation of FIG. 5.

The control circuit 112 is configured to control charging of the first battery 104 and charging of the second battery 106. The control circuit 112 is configured to receive first status information 142 corresponding to the first battery 104 and to schedule charging of the first battery 104 via a first charging line 150. As an example, the first status information 142 can indicate the first state of charge 170 of the first battery 104. The control circuit 112 is also configured to receive second status information 144 that can indicate the second state of charge 172 of the second battery 106 and to schedule charging of the second battery 106 via a second charging line 152. In some implementations, the control circuit 112 can coordinate charging of the first battery 104 and the second battery 106 based on relative remaining charge of each of the batteries 104, 106, based on a historical power usage, current power usage, or predicted power usage of each of the batteries 104, 106, based on whether the electrical power management system 102 is coupled to an external power supply, based on one or more other factors, or any combination thereof. An example of battery charging is described in further detail with reference to FIG. 3.

In an illustrative example of operation, the control circuit 112 detects changes in the electrical condition of the battery bus 110 based on the data 140. Prior to startup of the vehicle 160, the control circuit 112 causes power to the battery bus 110 to be provided exclusively (or predominately) by the second battery 106 to satisfy a "keep-alive" power draw of devices of the load 130, that are in a low-power or sleep mode when the vehicle 160 is non-operational. For example, the control circuit 112 can generate a value of the first control signal 146 that causes the first coupler 114 to decouple the first battery 104 from the battery bus 110. Because the "keep alive" power draw has small magnitude, is relatively unchanging, and may continue for long durations, such as overnight, the higher energy density of the second battery 106 provides more efficient battery usage than the higher power density of the first battery 104.

During startup of the vehicle 160, the data 140 may indicate that a power demand of the load 130 has transitioned from the "keep-alive" power draw to a "start-up"

power draw during which one or more electronic components are powered up in preparation for operation of the vehicle 160. In response to detecting an increase to a relatively large power demand at the battery bus 110, the control circuit 112 can increase the power provided by the first battery 104 and decrease the power provided by the second battery 106. For example, the control circuit 112 can generate a value of the first control signal 146 that causes the first coupler 114 to connect the first battery 104 to power the battery bus 110 to satisfy a relatively large power draw of the load 130. After the first power 162 provided by the first battery 104 is increased, the control circuit 112 can generate a value of the second control signal 148 that causes the second coupler 116 to reduce (or terminate) the second power 164 provided by the second battery 106 to the battery bus 110. Because the "startup" power draw has a quickly increasing magnitude and is relatively short in duration, the higher power density of the first battery 104 provides more effective power demand response than the higher energy density of the second battery 106.

After startup of the vehicle 160, the data 140 may indicate that a power demand of the load 130 indicates that an electric motor coupled to the battery bus 110 is drawing a relatively large amount of power to accelerate the vehicle 160. In response, the control circuit 112 can cause the first coupler 114 and the second coupler 116 to allow unrestricted power from both batteries 104, 106 to the battery bus 110 for improved performance of the vehicle 160. During other conditions, such as when the vehicle 160 is propelled at a relatively stable speed with relatively little acceleration, the control circuit 112 may control the couplers 114, 116 to cause a greater proportion of the power demand 166 to be provided by the second battery 106 for increased overall battery charge conservation.

Thus, the control circuit 112 may adjust proportions of power supplied by the first battery 104 and the second battery 106 to accommodate detected power demands of the load 130 at the battery bus 110. As a result, the first battery 104 may be more heavily used in conditions for which the first battery 104 is more suitable than the second battery 106, such as high-power demand conditions, and the second battery 106 may be more heavily used in conditions for which the second battery 106 is more suitable than the first battery 104, such as steady state operation conditions. Overall battery performance of the system 100, such as peak power delivery and aggregate discharge rate, may therefore exceed performance of a system that instead uses batteries having a single battery chemistry.

Although the system 100 is illustrated as including two batteries, in other implementations more than two batteries may be used, such as described in further detail with reference to FIG. 5. Although the batteries 104, 106 are depicted in block form for clarity of explanation, it should be understood that each of the batteries 104, 106 may include internal components such as one or more storage cells or other energy storage devices, sensors, charging isolation switches, controllers, other components, or a combination thereof, and may be referred to as a "battery pack." Although a single battery bus 110 is depicted, in other implementations multiple battery busses may be used, and the control circuit 112 can control power supply to the battery busses individually based on the respective power demands on each of the individual battery busses.

Figure 2:
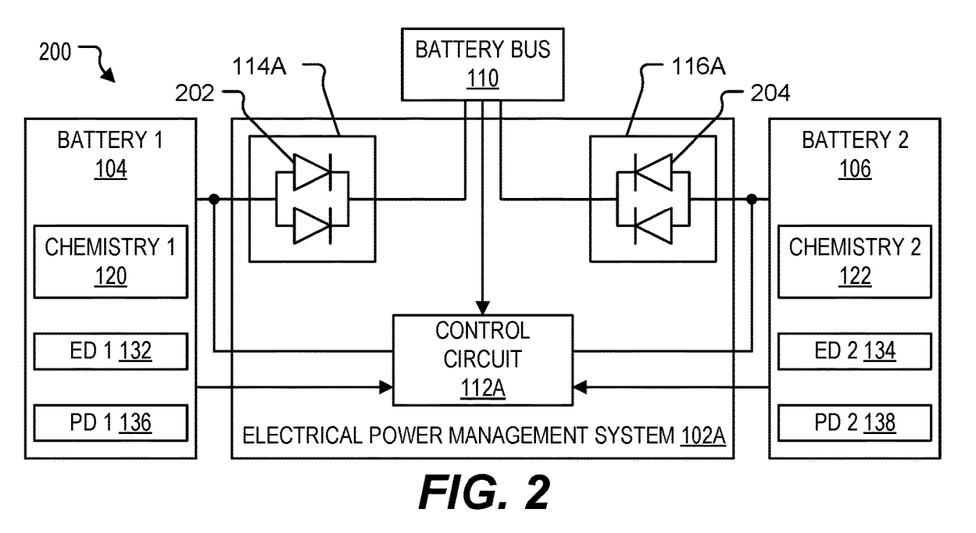
FIG. 2 is a diagram that illustrates a first implementation of the electrical power management system that uses passive coupler elements.

Referring to FIG. 2, a system 200 is depicted that includes a diode-based implementation of the electrical power management system 102A coupled to the first battery 104, the second battery 106, and the battery bus 110 of FIG. 1. The first coupler 114A includes multiple diodes, such a representative first diode 202, that couple the first battery 104 to the battery bus 110 and that permit current flow from the first battery 104 to the battery bus 110. The second coupler 116A includes multiple diodes, such a representative second diode 204, that couple the second battery 106 to the battery bus 110 and that permit current flow from the second battery 106 to the battery bus 110.

The electrical power management system 102A is configured as a "floating" architecture in which, when the first battery voltage 174 of the first battery 104 and the second battery voltage 176 of the second battery 106 have substantially the same voltage level, the first battery 104 and the second battery 106 respond appropriately to load demand without active control by the control circuit 112A. In an illustrative example, the first battery 104 is dedicated as the high energy density battery and the first battery voltage 174 is higher than or at the same level as the second battery voltage 176, and the second battery 106 is dedicated as the high power density battery and the second battery voltage 176 is at the same level as or lower than the first battery voltage 174. When a load generates a high power demand on the battery bus 110, most of the power to battery bus 110 is provided by the first battery 104 until the first battery voltage 174 drops below the voltage level of the second battery 106. As another example, when a load generates a high energy demand on the battery bus 110, most of the power to the battery bus 110 is provided by the first battery 104 until its voltage drops below the voltage level of the second battery 106. The diodes of the first coupler 114A prevent the first battery 104 from drawing power from the second battery 106 and from any other source that could be powering the battery bus 110, such as if an external source is plugged in and providing power to the battery bus 110 in a charging mode. Similarly, the diodes of the second coupler 116A prevent the second battery 106 from drawing power from the first battery 104 and from any other source that could be powering the battery bus 110.

In some implementations, the control circuit 112A is configured to charge the first battery 104, the second battery 106, or both, when the load on the battery bus 110 is low enough so that the charging power can be shared between the first battery 104, the second battery 106, and the battery bus 110. The control circuit 112A is configured to inhibit charging when the load on the battery bus 110 exceeds the battery charging power supply.

By using the floating architecture, the electrical power management system 102A provides proportional power to the battery bus 110 from each of the first battery 104 and the second battery 106 based solely on the battery bus demand and the battery voltages without actively controlling the first coupler 114A and the second coupler 116. Thus, a power consumption and complexity associated with the control circuit 112A can be reduced as compared to implementations in which the first coupler 114A and the second coupler 116A are actively controlled.

Figure 3:
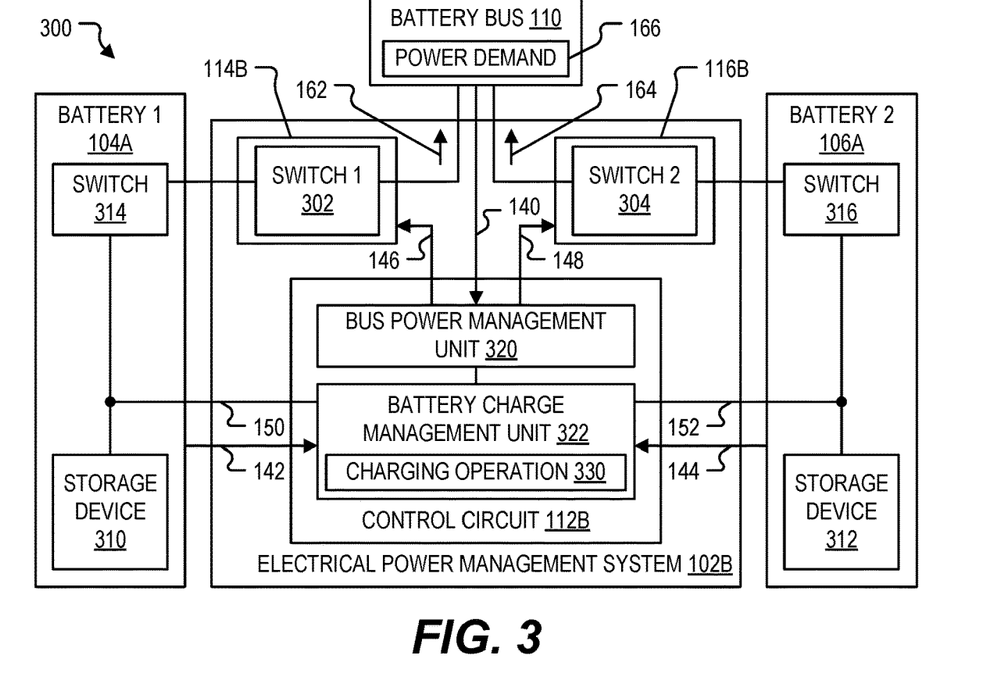
FIG. 3 is a diagram that illustrates a second implementation of the electrical power management system that uses switch-based coupler elements.

Referring to FIG. 3, a system 300 is depicted that includes a switch-based implementation of the electrical power management system 102B coupled to the first battery 104A, the second battery 106A, and the battery bus 110.

The first battery 104A includes a first storage device 310 coupled to a first charging isolation switch 314. In some implementations the first storage device 310 includes multiple battery cells or other energy storage devices, such as supercapacitors. The first charging isolation switch 314 is configured to selectively interrupt power transfer from the first storage device 310 to the battery bus 110, such as to isolate the first storage device 310 for recharging by the electrical power management system 102B.

The second battery 106A includes a second storage device 312 coupled to a second charging isolation switch 316. In some implementations the second storage device 312 includes multiple battery cells or other energy storage devices, such as supercapacitors. The second charging isolation switch 316 is configured to selectively interrupt power transfer from the second storage device 312 to the battery bus 110, such as isolate the second storage device 312 for recharging by the electrical power management system 102B.

The first coupler 114B includes a first switch 302 responsive to the control circuit 112B. The first switch 302 is coupled to the first battery 104A and to the battery bus 110. The control circuit 112B is further configured to selectively open or close the first switch 302 by generating the first control signal 146 responsive to an electrical condition of the battery bus 110, such as the power demand 166, that is detected and communicated to the control circuit 112B via the data 140. Closing the first switch 302 enables the first battery 104A to provide the first power 162 to the battery bus 110. Opening the first switch 302 electrically isolates the first battery 104A from the battery bus 110 to prevent the first battery 104A from providing power to the battery bus 110.

The second coupler 116B includes a second switch 304 responsive to the control circuit 112B. The second switch 304 is coupled to the second battery 106A and to the battery bus 110. The control circuit 112B is further configured to selectively open or close the second switch 304 by generating the second control signal 148 responsive to the electrical condition of the battery bus 110. Closing the second switch 304 enables the second battery 106A to provide the second power 164 to the battery bus 110. Opening the second switch 304 electrically isolates the second battery 106A from the battery bus 110 to prevent the second battery 106A from providing power to the battery bus 110.

The control circuit 112B includes a bus power management unit 320 and a battery charge management unit 322. The battery charge management unit 322 is configured to selectively initiate a charging operation 330 of at least one of the first battery 104A or the second battery 106A responsive to at least one of the first status information 142 corresponding to the first battery 104A and the second status information 144 corresponding to the second battery 106A.

The bus power management unit 320 is responsive to the battery charge management unit 322 to decouple at least one of the first battery 104A or the second battery 106A from the battery bus 110 in response to at least one of initiation of the charging operation 330, a state of charge of at least one of the first battery 104A or the second battery 106A, or a change in operation (e.g. a change in output) of at least one of the first battery 104A or the second battery 106A. For example, in some implementations the bus power management unit 320 electrically isolates the first battery 104A from the battery bus 110 by opening the first switch 302 to enable charging of the first battery 104A without interfering with the supply of power from the second battery 106A to the battery bus 110. As another example, in some implementations the bus power management unit 320 electrically isolates the first storage device 310 from the battery bus 110 by sending a signal to the first battery 104A to cause the first battery 104A to open the first charging isolation switch 314. The bus power management unit 320 is similarly configured to electrically isolate the second battery 106A from the battery bus 110 by opening the second switch 304 or the second charging isolation switch 316 to enable charging of the second battery 106A without interfering with the supply of power from the first battery 104A to the battery bus 110.

By including the first switch 302 in the first coupler 114B and the second switch 304 in the second coupler 116B, the electrical power management system 102B enables the power demand 166 to be satisfied by individually controlling coupling and decoupling of the first battery 104A and the second battery 106A to the battery bus 110. As a result, the system 300 allows for a wider range of battery voltage levels between the batteries 104A, 106A as compared to the implementation of FIG. 2. In addition, because the first battery 104A can be charged while the second battery 106A powers a load via the battery bus 110, the system 300 is suitable for use in an application where one battery or energy source is used for first phase operation and is then recharged while another battery or energy source is used for the next phase of operation and continues this way in an alternating mode until the operation is completed.

Although each of the first coupler 114B and the second coupler 116B is illustrated as having a single switch, in other implementations one or both of the first coupler 114B and the second coupler 116B includes one or more additional elements. For example, in some implementations the first coupler 114B includes one or more diodes, such as the first diode 202 of FIG. 2, serially coupled to the first switch 302 and the second coupler 116B includes one or more diodes, such as the second diode 204 serially coupled to the second switch 304. As a result, either of the switches 302, 304 can be opened to isolate a battery from the battery bus 110, and when both switches 302, 304 are closed the electrical power management system 102B operates as described with reference to the floating architecture of FIG. 2.

As another example, in some implementations the first coupler 114 includes multiple switches in parallel that are independently controllable responsive to the first control signal 146 so that power through the first coupler 114 can be throttled by opening one or more of the switches. For example, in an implementation in which the first coupler 114 includes two equally-sized switches, current flow can be halved by opening one switch, and current flow can be stopped by opening both switches. Any number of switches may be used to provide a corresponding granularity of current control, and the switches may be substantially equally sized or may be variously sized. The second coupler 116 may have a similar configuration as the first coupler 114, including a same number of switches as the first coupler 114 or a different number of switches, and the switches of the second coupler 116 may be of the same size or of a different size as the switches of the first coupler 114.

Figure 4:
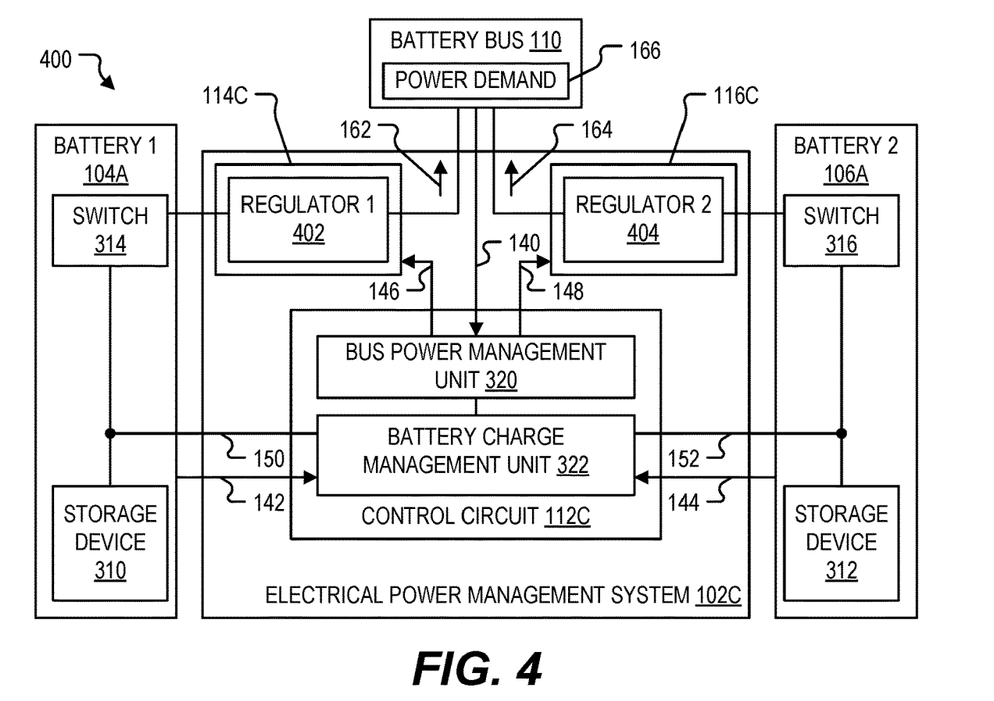
FIG. 4 is a diagram that illustrates a third implementation of the electrical power management system that uses regulator couplers.

Referring to FIG. 4, a system 400 is depicted that includes a regulator-based implementation of the electrical power management system 102C coupled to the first battery 104A, the second battery 106A, and the battery bus 110.

The first coupler 114C includes a first regulator 402 configured to regulate the first power 162 provided from the first battery 104A to the battery bus 110 responsive to the control circuit 112C. The first regulator 402 is configured to control at least one of a voltage or a current provided by the first battery 104A to the battery bus 110. The second coupler 116C includes a second regulator 404 configured to regulate the second power 164 provided from the second battery 106A to the battery bus 110 responsive to the control circuit 112C. In an example implementation, the regulators 402, 404 include DC convertor regulators. In some implementations, each of the regulators 402, 404 incorporates power electronics configured to improve or optimize power draw from the respective batteries 104A, 106A and to manage power quality on the battery bus 110.

In some implementations, the control circuit 112C is configured to control the first regulator 402 and the second regulator 404 to smoothly adjust a proportion of power applied to the battery bus 110 from the first battery 104A and from the second battery 106A responsive to a power demand 166 at the battery bus 110. In a particular example, the control circuit 112C is configured to provide a multi-bit value as the first control signal 146 that indicates a configuration instruction for the first regulator 402. For example, the first control signal 146 may include a first value that indicates an output voltage level, a current limit, or some other regulator configuration to adjust operation of the first regulator 402. In a similar manner, the control circuit 112C may be configured to provide another multi-bit value as the second control signal 148 that indicates a configuration instruction for the second regulator 404. In contrast to an 'on' or 'off' switch setting as in FIG. 3, the regulators 402, 404 may be configurable to adjust an output current or voltage level on a highly granular or continuous basis to enable relatively small adjustments over time, in addition to enabling large adjustments to accommodate large, sudden changes in the power demand 166.

In another example, the control circuit 112C sends a single value to both regulators 402, 404 that indicates a proportion of the total power demand 166 to be provided by the first regulator 402, such as a number from 0 to 10, with '0' indicating that the first regulator 402 provides 0% of the power demand 166 and that the second regulator 404 provides 100% of the power demand 166, '3' indicating that the first regulator 402 provides 30% of the power demand 166 and that the second regulator 404 provides 70% of the power demand 166, '5' indicating that the first regulator 402 provides 50% of the power demand 166 and that the second regulator 404 provides 50% of the power demand 166, and '10' indicating that the first regulator 402 provides 100% of the power demand 166 and that the second regulator 404 provides 0% of the power demand 166, as illustrative, non-limiting examples. It will be understood that other ranges, data values, and signaling mechanisms may be used for the control signals 146, 148.

By using the regulators 402, 404, the system 400 can be configured to support a wider range of voltage levels of the batteries 104A, 106A, a larger range of battery chemistries and battery characteristics, or a combination thereof, as compared to the systems of FIG. 2 and FIG. 3. In addition, the regulators 402, 404 enable a more finely controlled power draw from the respective batteries 104A, 106A and also enable management of power quality on the battery bus 110.

Although each of the illustrated systems of FIGS. 2-4 includes coupler pairs having matching coupler types, such as diode-type couplers 114A, 116A, switch-type couplers 114B, 116B, and regulator-type couplers 114C, 116C, in other implementations couplers may have non-matching types. For example, the first coupler 114 of FIG. 1 may be implemented as the switch-type coupler 114B and the second coupler 116 may be implemented as the diode-type coupler 116A. It should be understood that any combination of the first coupler 114 having the diode-type, the switch-type, or the regulator-type, or a combination thereof, and the second coupler 116 having the diode-type, the switch-type, or the regulator-type, or a combination thereof, can be implemented.

Figure 5:
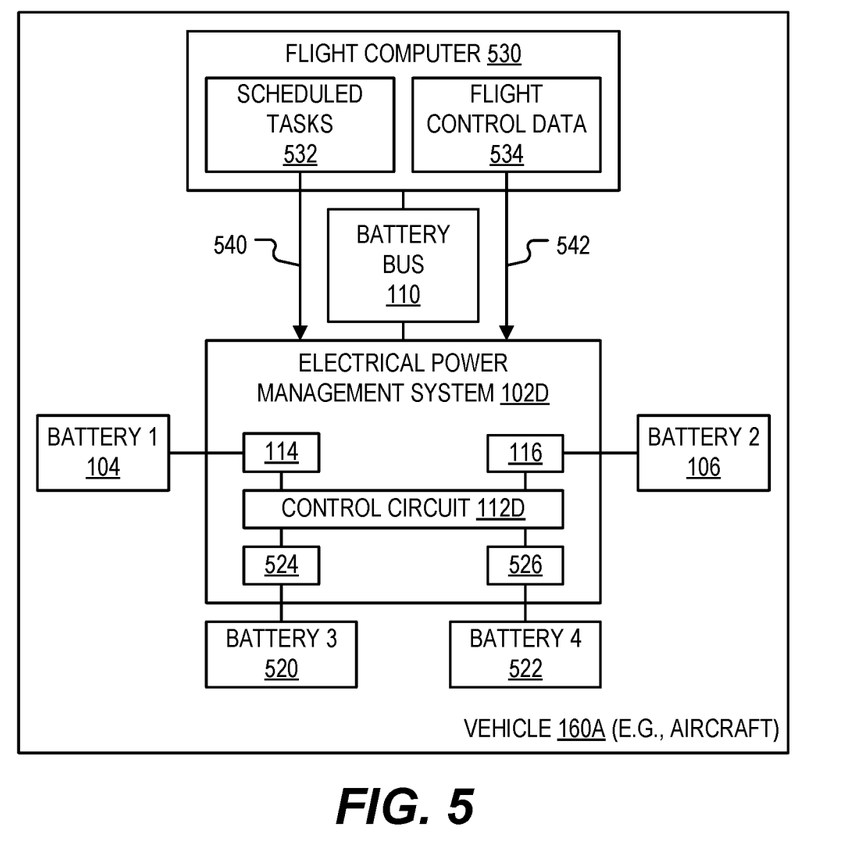
FIG. 5 is a diagram that illustrates a vehicle that includes the electrical power management system responsive to a flight computer.

Referring to FIG. 5, an implementation of a vehicle 160A is depicted that includes the electrical power management system 102D coupled to the first battery 104, the second battery 106, a third battery 520, and a fourth battery 522. The vehicle 160A also includes the battery bus 110 coupled to the electrical power management system 102D and to a flight computer 530. Power demand is predicted by the electrical power management system 102D based on one or more scheduled tasks 532 associated with operation of the vehicle 160A. In a particular implementation, the vehicle 160A is an aircraft.

Each of the batteries 104, 106, 520, and 522 may have a distinct battery chemistry from each of the other batteries. For example, batteries may be characterized according to a standardized set of characteristics such as specific energy, specific power, safety, performance, life span, and cost, as illustrative, non-limiting examples. Each of the batteries 104, 106, 520, and 522 may be selected to provide a distinct battery type that is well suited for particular operational conditions of the vehicle 160A. To illustrate, one of the batteries 104, 106, 520, or 522 may be selected as a high-cost battery that has a high specific power for high-power operations, another of the batteries 104, 106, 520, or 522 may be selected to supply a high specific energy at relatively high cost during steady-state operations, a third of the batteries 104, 106, 520, or 522 may be selected to supply energy with very high safety during landing operations, and a fourth of the batteries 104, 106, 520, or 522 may be selected to provide redundant energy storage at relatively low cost.

The electrical power management system 102D includes the control circuit 112D, the first coupler 114 that is coupled to the first battery 104, and the second coupler 116 that is coupled to the second battery 106. The electrical power management system 102D also includes a third coupler 524 coupled to the third battery 520 and a fourth coupler 526 coupled to the fourth battery 522. Each of the third coupler 524 and the fourth coupler 526 is responsive to the control circuit 112D and may be implemented as a diode-type coupler, such as described in FIG. 2, a switch-type coupler, such as described in FIG. 3, a regulator-type coupler, such as described in FIG. 4, or any combination thereof.

The flight computer 530 is configured to manage systems associated with aircraft flight and to initiate one or more associated tasks. For example, the flight computer 530 maintains a collection of scheduled tasks 532, such as tasks scheduled to be performed during a flight preparation sequence. To illustrate, the scheduled tasks 532 may include a sequence of powering up and testing various systems including avionics systems, communication systems, flight control surface systems, propulsion systems, etc. The scheduled tasks 532 may be provided as first vehicle data 540, flight control data 534 associated with the scheduled tasks 532 may be provided as second vehicle data 542, or a combination thereof, to the electrical power management system 102.

The control circuit 112D is configured to receive flight control data 534 corresponding to the scheduled tasks 532. The control circuit 112D is configured to predict impending changes in a power demand at the battery bus 110 resulting from initiation, performance, and completion of one or more of the scheduled tasks 532.

By predicting upcoming changes in power demand, the electrical power management system 102D can more efficiently couple, decouple, and regulate power provided by the various batteries as compared to systems that operate in response to detecting changes in power demand at the battery bus 110.

Figure 6:
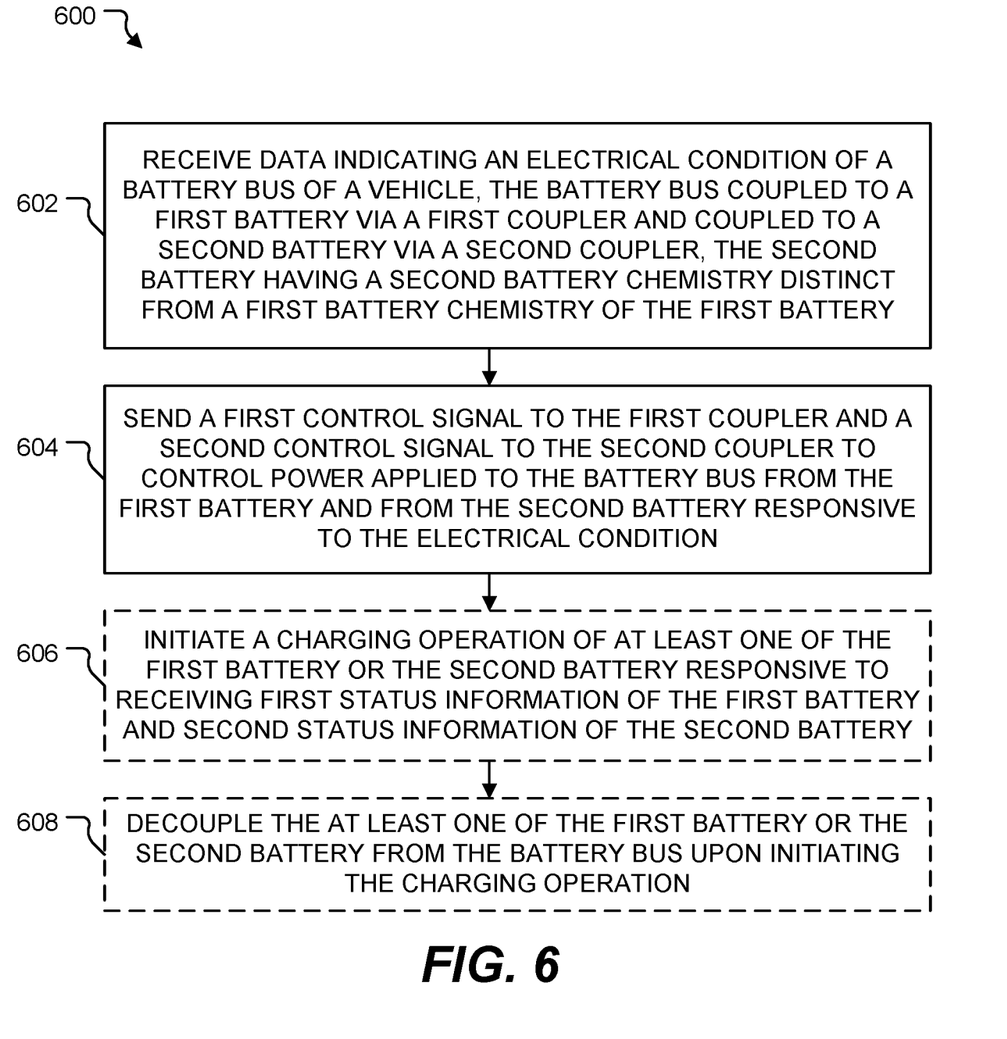
FIG. 6 is a diagram that illustrates a flow chart of an example of a method of managing a heterogeneous battery system that may be performed by the system of FIG. 1.

Referring to FIG. 6, method 600 of operating an electrical power management system for a vehicle is depicted. In some implementations, the method 600 corresponds to operating the electrical power management system 102 for the vehicle 160. The method 600 includes receiving data, such as the data 140, indicating an electrical condition of a battery bus 110 of the vehicle 160, at step 602. In some implementations, the data 140 is received by the control circuit 112 indicating the electrical condition of the battery bus 110. The battery bus is coupled to a first battery via a first coupler and coupled to a second battery via a second coupler. The second battery has a second battery chemistry distinct from a first battery chemistry of the first battery. As an example, the battery bus 110 is coupled to the first battery 104 via the first coupler 114 and coupled to the second battery 106 via the second coupler 116. The second battery 106 has the second battery chemistry 122 that is distinct from the first battery chemistry 120 of the first battery 104.

The method 600 includes sending a first control signal to the first coupler and a second control signal to the second coupler to adjust a proportion of power applied to the battery bus from the first battery and from the second battery responsive to the electrical condition, at step 604. In an example, the control circuit 112 sends the first control signal 146 to the first coupler 114 and sends the second control signal 148 to the second coupler 116 to adjust a proportion of power applied to the battery bus 110 from the first battery 104 and from the second battery 106 responsive to the electrical condition (e.g., the power demand 166).

In some implementations, the first control signal causes a first switch in the first coupler to disconnect the first battery from the battery bus and the second control signal causes a second switch in the second coupler to connect the second battery to the battery bus. In an example, the first control signal 146 causes the first switch 302 in the first coupler 114B of FIG. 3 to disconnect the first battery 104A from the battery bus 110 and the second control signal 148 causes the second switch 304 in the second coupler 116B to connect the second battery 106A to the battery bus 110.

In some implementations, the first control signal and the second control signal cause a first regulator in the first coupler and a second regulator in the second coupler to smoothly control the power applied to the battery bus from the first battery and from the second battery responsive to a power demand at the battery bus. In an example, the first control signal 146 and the second control signal 148 cause the first regulator 402 in the first coupler 114C of FIG. 4 and the second regulator 404 in the second coupler 116C to smoothly adjust a proportion of power applied to the battery bus 110 from the first battery 104A and from the second battery 106A (e.g., by reducing the first power 162 and increasing the second power 164) responsive to the power demand 166 at the battery bus 110.

The method 600 optionally includes initiating a charging operation of at least one of the first battery or the second battery responsive to receiving first status information of the first battery and second status information of the second battery, at step 606, and decoupling the at least one of the first battery or the second battery from the battery bus upon initiating the charging operation, at step 608. In an example, the control circuit 112 (e.g., the battery charge management unit 322) initiates the charging operation 330 of at least one of the first battery 104 or the second battery 106 responsive to receiving the first status information 142 and the second status information 144. The control circuit 112 (e.g., the bus power management unit 320) causes, via at least one of the first control signal 146 or the second control signal 148, the first coupler 114 to decouple the first battery 104 from the battery bus 110, the second coupler 116 to decouple the second battery 106 from the battery bus 110, or both, upon initiation of the charging operation 330. In some implementations, decoupling is performed by opening a switch (e.g., the switch 302 of FIG. 3) or by adjusting a regulator (e.g., the regulator 402 of FIG. 4) to output zero power.

By controlling the proportion of power provided to the battery bus from various batteries having different characteristics based on the electrical condition at the battery bus, a heterogeneous battery system can provide improved performance, such as more energy and power for longer operating capabilities, over varying load conditions as compared to a homogeneous battery system.

Figure 7:
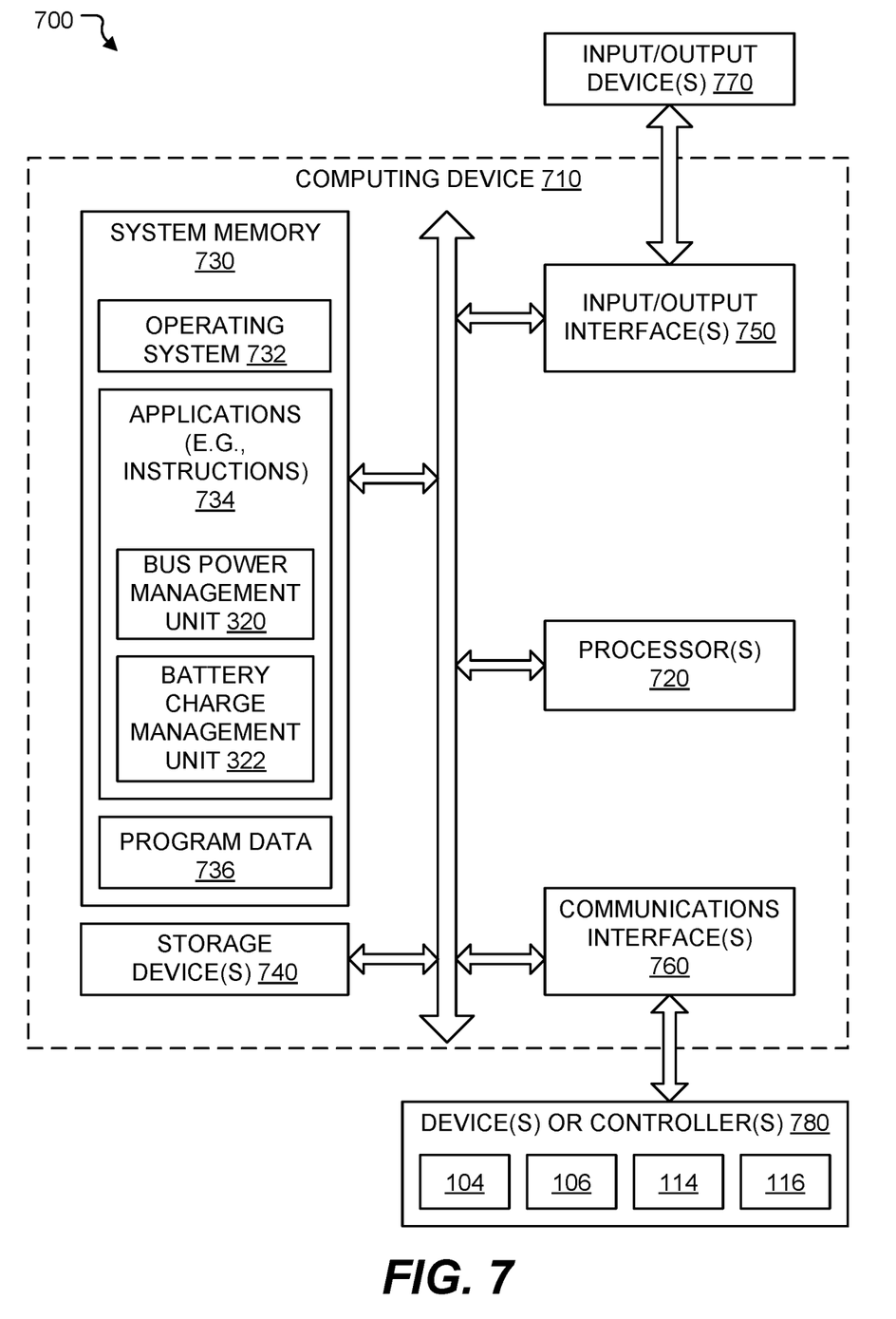
FIG. 7 is a block diagram of a computing environment including a computing device configured to support aspects of computer-implemented methods and computer-executable program instructions (or code) according to the present disclosure.

FIG. 7 is a block diagram of a computing environment 700 including a computing device 710 configured to support aspects of computer-implemented methods and computer-executable program instructions (or code) according to the present disclosure. For example, the computing device 710, or portions thereof, is configured to execute instructions to initiate, perform, or control one or more operations described with reference to FIGS. 1-6.

The computing device 710 includes one or more processors 720. The processor(s) 720 are configured to communicate with system memory 730, one or more storage devices 740, one or more input/output interfaces 750, one or more communications interfaces 760, or any combination thereof. The system memory 730 includes volatile memory devices (e.g., random access memory RAM devices), nonvolatile memory devices (e.g., read-only memory ROM devices, programmable read-only memory, and flash memory), or both. The system memory 730 stores an operating system 732, which may include a basic input/output system for booting the computing device 710 as well as a full operating system to enable the computing device 710 to interact with users, other programs, and other devices. The system memory 730 stores system (program) data 736, such as a historical record of electrical characteristics (e.g., the data 140) and battery conditions (e.g., the first status information 142, the second status information 144), other data, or a combination thereof.

The system memory 730 includes one or more applications 734 (e.g., sets of instructions) executable by the processor(s) 720. As an example, the one or more applications 734 include instructions executable by the processor(s) 720 to initiate, control, or perform one or more operations described with reference to FIGS. 1-6. To illustrate, the one or more applications 734 include instructions executable by the processor(s) 720 to initiate, control, or perform one or more operations described with reference to control circuit 112, the bus power management unit 320, the battery charge management unit 322, or a combination thereof.

The one or more storage devices 740 include nonvolatile storage devices, such as magnetic disks, optical disks, or flash memory devices. In a particular example, the storage devices 740 include both removable and non-removable memory devices. The storage devices 740 are configured to store an operating system, images of operating systems, applications (e.g., one or more of the applications 734), and program data (e.g., the program data 736). In a particular aspect, the system memory 730, the storage devices 740, or both, include tangible computer-readable media. In a particular aspect, one or more of the storage devices 740 are external to the computing device 710.

The one or more input/output interfaces 750 enable the computing device 710 to communicate with one or more input/output devices 770 to facilitate user interaction. For example, the one or more input/output interfaces 750 can include a display interface, an input interface, or both. The processor(s) 720 are configured to communicate with devices or controllers 780 via the one or more communications interfaces 760. For example, the one or more communications interfaces 760 can include a network interface. The devices or controllers 780 can include, for example, the first battery 104, the second battery 106, the first coupler 114, the second coupler 116, other devices, or a combination thereof.

In conjunction with the described systems and methods, an electrical power management system for a vehicle is disclosed that includes means for controlling battery coupling devices (e.g., the first coupler 114 and the second coupler 116), the means for controlling configured to be coupled to a battery bus of the vehicle. For example, the means for controlling may correspond to the control circuit 112 of FIGS. 1-5, the computing device 710 of FIG. 7, one or more other controllers, processors, or circuits configured to control battery coupling devices, or any combination thereof.

The electrical power management system also includes a first means for selectively coupling a first battery to the battery bus responsive to the control circuit, the first battery having a first battery chemistry. For example, the first means for selectively coupling may correspond to the first coupler 114 of FIGS. 1-5 or of FIG. 7, one or more other circuits or devices configured to selectively couple the first battery to the battery bus, or any combination thereof.

The electrical power management system also includes a second means for selectively coupling a second battery to the battery bus responsive to the control circuit, the second battery having a second battery chemistry distinct from the first battery chemistry. For example, the second means for selectively coupling may correspond to the second coupler 116 of FIGS. 1-5 or of FIG. 7, one or more other circuits or devices configured to selectively couple the second battery to the battery bus, or any combination thereof.

In some implementations, a non-transitory, computer readable medium stores instructions that, when executed by a processor, cause the processor to initiate, perform, or control operations to perform part or all of the functionality described above. For example, the instructions may be executable to implement the method of FIG. 6. In some implementations, part or all of one or more of the method of FIG. 6 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An electrical power management system for a vehicle, comprising:
 a control circuit configured to control whether power supplied to a load via a battery bus of the vehicle is predominately provided by a first battery or a second battery in response to a power demand of the load, wherein the power demand is predicted by the control circuit based on one or more scheduled tasks associated with operation of the vehicle;
 a first coupler configured to be coupled to the first battery and to the battery bus, wherein the first coupler is responsive to the control circuit to selectively couple the first battery to the battery bus, and wherein the first battery has a first battery chemistry; and
 a second coupler configured to be coupled to the second battery and to the battery bus, wherein the second coupler is responsive to the control circuit to selectively couple the second battery to the battery bus, and wherein the second battery has a second battery chemistry distinct from the first battery chemistry.

2. The electrical power management system of claim 1, wherein the first battery chemistry of the first battery is optimized or configured to have a first power density and also has a first energy density, wherein the second battery chemistry of the second battery is optimized or configured to have a second energy density and also has a second power density, wherein the first power density is higher than the second power density, wherein the first energy density is lower than the second energy density, and wherein the control circuit is configured to control the first coupler and the second coupler so that the power supplied to the load via the battery bus is predominately provided by the first battery or the second battery further in response to at least one of a voltage of the battery bus, a first state of charge of the first battery, a second state of charge of the second battery, or a vehicle data input.

3. The electrical power management system of claim 1, wherein the first battery chemistry comprises a first lithium-ion battery chemistry that is optimized or configured for power capability, and wherein the second battery chemistry comprises a second lithium-ion battery chemistry that is optimized or configured to provide energy capability.

4. The electrical power management system of claim 1, wherein the first battery chemistry comprises a lithium-ion battery chemistry and wherein the second battery chemistry comprises a non-lithium-ion battery chemistry.

5. The electrical power management system of claim 1, wherein the first battery chemistry corresponds to a first battery voltage and wherein the second battery chemistry corresponds to a second battery voltage that is different from the first battery voltage.

6. The electrical power management system of claim 1, wherein the first coupler comprises a first switch responsive to the control circuit, wherein the first switch is coupled to the first battery and to the battery bus, and wherein the control circuit is further configured to selectively open or close the first switch responsive to an electrical condition of the battery bus.

7. The electrical power management system of claim 6, wherein the second coupler comprises a second switch responsive to the control circuit, wherein the second switch is coupled to the second battery and to the battery bus, and wherein the control circuit is further configured to selectively open or close the second switch responsive to the electrical condition of the battery bus.

8. The electrical power management system of claim 1, wherein the control circuit comprises:
  a battery charge management unit configured to selectively initiate a charging operation of at least one of the first battery or the second battery responsive to first status information corresponding to the first battery and second status information corresponding to the second battery; and
  a bus power management unit responsive to the battery charge management unit to decouple at least one of the first battery or the second battery from the battery bus in response to at least one of:
    initiation of the charging operation;
    a state of charge of the at least one of the first battery or the second battery; or
    a change in operation of the at least one of the first battery or the second battery.

9. The electrical power management system of claim 1, wherein the first coupler comprises a first regulator configured to regulate first power provided from the first battery to the battery bus responsive to the control circuit.

10. The electrical power management system of claim 9, wherein the first regulator is configured to control at least one of a voltage or a current provided to the battery bus.

11. The electrical power management system of claim 9, wherein the second coupler comprises a second regulator configured to regulate second power provided from the second battery to the battery bus responsive to the control circuit.

12. The electrical power management system of claim 11, wherein the control circuit is configured to control the first regulator and the second regulator to smoothly control the power applied to the battery bus from the first battery and from the second battery responsive to the power demand.

13. The electrical power management system of claim 12, wherein the power demand is further determined by the control circuit via sensing of the battery bus.

14. The electrical power management system of claim 12, wherein the vehicle is an aircraft.

15. The electrical power management system of claim 14, wherein the control circuit is configured to receive flight control data corresponding to the scheduled tasks.

16. A method of operating an electrical power management system for a vehicle, the method comprising:
  receiving data indicating an electrical condition of a battery bus of the vehicle, wherein the electrical condition indicates a power demand of a load or a type of the load, wherein the battery bus is coupled to a first battery via a first coupler and coupled to a second battery via a second coupler, and wherein the second battery has a second battery chemistry distinct from a first battery chemistry of the first battery;
  determining a predicted power demand of the load based on one or more scheduled tasks associated with operation of the vehicle; and
  sending a first control signal to the first coupler and a second control signal to the second coupler to control whether power applied to the load via the battery bus is predominantly provided from the first battery or from the second battery in response to the predicted power demand of the load.

17. The method of claim 16, wherein the first battery chemistry of the first battery is optimized or configured to have a first power density and also has a first energy density, wherein the second battery chemistry of the second battery is optimized or configured to have a second energy density and also has a second power density, wherein the first power density is higher than the second power density, wherein the first energy density is lower than the second energy density, and wherein the first control signal and the second control signal cause the power supplied to the load via the battery bus to be predominately provided by the first battery or the second battery further in response to at least one of a voltage of the battery bus, a first state of charge of the first battery, a second state of charge of the second battery, or a vehicle data input.

18. The method of claim 16, wherein the first control signal causes a first switch in the first coupler to disconnect the first battery from the battery bus and the second control signal causes a second switch in the second coupler to connect the second battery to the battery bus.

19. The method of claim 16, wherein the first control signal and the second control signal cause a first regulator in the first coupler and a second regulator in the second coupler to smoothly control the power applied to the battery bus from the first battery and from the second battery responsive to a power demand at the battery bus.

20. The method of claim 16, further comprising:
  initiating a charging operation of at least one of the first battery or the second battery responsive to receiving first status information of the first battery and second status information of the second battery; and
  decoupling the at least one of the first battery or the second battery from the battery bus upon initiating the charging operation.

* * * * *